J. OLIVER.

Chills for Casting Mold-Boards.

No. 5,828. Reissued April 7, 1874.

WITNESSES:
P. C. Dieterich.
H. B. Scott

INVENTOR
James Oliver.
per C. H. Watson & Co
ATTORNEYS.

AM. PHOTO-LITHOGRAPHIC Co. N. Y. (OSBORNE'S PROCESS.)

UNITED STATES PATENT OFFICE.

JAMES OLIVER, OF SOUTH BEND, INDIANA.

IMPROVEMENT IN CHILLS FOR CASTING MOLD-BOARDS.

Specification forming part of Letters Patent No. 76,652, dated April 14, 1868; reissue No. 5,828, dated April 7, 1874; application filed February 3, 1874.

DIVISION A.

*To all whom it may concern:*

Be it known that I, JAMES OLIVER, of South Bend, in the county of St. Joseph and State of Indiana, have invented certain new and useful Improvements in Casting Mold-Boards for Plows; and it consists in the process by which the mold-boards are made, and in the construction of the devices used, as hereinafter more fully described, and pointed out by the claim; and I do hereby declare that the following is a full, clear, and exact description thereof, which will enable others skilled in the arts to which it appertains to make and use the same, reference being had to the accompanying drawings, with letters of reference marked thereon, forming a part of this specification, in which—

Figures 1, 2, 3:
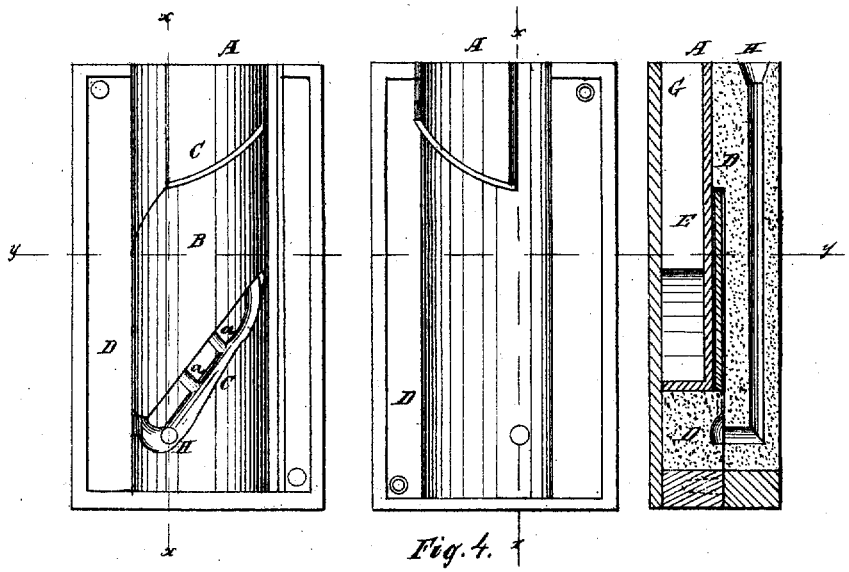
Figure 4:
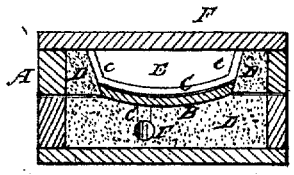

Figure 1 represents one part of the open flask, with the pattern resting on the chill. Fig. 2 represents the other part of the flask, as seen when taken from the pattern or when the parts of the flask are separated. Fig. 3 is a longitudinal section through lines *x x*, Figs. 1 and 2; and Fig. 4 is a transverse section through lines *y y*.

A represents the flask, composed of two parts, the cope and drag. B represents the mold-board pattern, constructed to conform to the shape of the mold-board to be made. C represents the chill, the face of which is curved to correspond to the shape of the face of the pattern, one end and the sides *c* of the said chill extending outward to form a chamber, E, of metal, which is closed by cover F, opposite to the chill, and the end G of the chamber is left open.

In casting, the pattern B is placed upon the chill C, the spaces D filled with sand, the pattern removed, and the sprue-hole H and the gate *a* formed in any known or convenient manner. The chamber E is then filled with hot or boiling water, after which the molten metal is poured in through the sprue-hole H, and enters the space formed by the pattern through the gate *a*. The sand in the flask is naturally damp, and the dampness coming in contact with the chill rusts the chill, and also condenses upon the face of the chill, so that were the metal to come in contact with the chill while in this condition the dampness would cause a flickering or disturbance of the molten metal, which, if cooled in this condition, would make a rough uneven surface on the face of the mold-board; and, further, were the chill cold in casting thin articles like the mold-board, requiring a large chilled surface, the molten metal would commence to cool before it covered the entire surface of the chill, and make an imperfect casting.

To remedy this, I first fill the chamber, of which the chill forms a part, with hot or boiling water, which heats the chill and absorbs the dampness, so that when the molten metal is poured in, there being no dampness, the metal flows evenly and smoothly over the surface of the chill, which gives a smooth and even surface to the face of the mold-boards, which cannot be done by the old method of casting mold-boards. The water also assists in absorbing the heat from the melted iron, by keeping the chill comparatively cool, thereby assisting in hardening the casting. When the castings are taken from the mold they are treated by a process described in another division of this application.

Having thus fully described my invention, what I claim, and desire to secure by Letters Patent, is—

The process of casting and chilling plow mold-boards by means of a hot-water chamber, E, the bottom of which forms the chill and a mold, substantially as and for the purpose specified.

In testimony whereof I hereunto set my hand this 31st of January, 1874.

JAMES OLIVER.

Witnesses:
C. H. WATSON,
J. TYLER POWELL.